United States Patent
Mintgen et al.

(10) Patent No.: US 6,920,669 B2
(45) Date of Patent: Jul. 26, 2005

(54) CATCH BETWEEN TWO ASSEMBLIES MOVEABLE IN RELATION TO ONE ANOTHER

(75) Inventors: Rolf Mintgen, Thür (DE); Dirk Rennecke, Andernach (DE); Dirk Pohl, Tübingen (DE); Ivica Kolaric, Esslingen (DE)

(73) Assignee: Stabilus GmbH, Koblenz (DE)

( * ) Notice: Subject to any disclaimer, the term of this patent is extended or adjusted under 35 U.S.C. 154(b) by 199 days.

(21) Appl. No.: 10/199,555

(22) Filed: Jul. 19, 2002

(65) Prior Publication Data

US 2003/0030286 A1 Feb. 13, 2003

(30) Foreign Application Priority Data

Jul. 19, 2001 (DE) .......................... 101 35 253

(51) Int. Cl.⁷ .................................. E05F 3/16
(52) U.S. Cl. ...................... 16/319; 296/146.11; 16/317
(58) Field of Search ................ 292/195, 194, 292/2; 16/316, 297, 317, 319, 321, 337, 374, 376, 77, 82, DIG. 17; 296/146.11, 146.12, 146.13, 202

(56) References Cited

U.S. PATENT DOCUMENTS

| | | | |
|---|---|---|---|
| 2,079,054 A | * 5/1937 | Etienne ..................... 188/82.3 |
| 2,874,960 A | * 2/1959 | Vernon ........................ 310/93 |
| 3,796,451 A | * 3/1974 | Schultz ....................... 292/263 |
| 5,346,272 A | * 9/1994 | Priest et al. ............ 296/146.11 |
| 5,468,042 A | 11/1995 | Heinrichs et al. ........ 296/146.4 |
| 5,553,828 A | 9/1996 | Jaenker .................. 251/129.01 |
| 5,671,905 A | 9/1997 | Hopkins, Jr. ............ 251/129.01 |
| 5,873,622 A | * 2/1999 | Kluting et al. .......... 296/146.11 |
| 6,073,309 A | * 6/2000 | Kluting et al. ................. 16/334 |
| 6,314,612 B1 | 11/2001 | Rennecke et al. ............. 16/54 |
| 6,516,495 B1 | * 2/2003 | Michalak ..................... 16/320 |
| 6,607,236 B2 | * 8/2003 | Mooy et al. ........... 296/146.11 |
| 6,681,444 B2 | * 1/2004 | Breed et al. .................... 16/82 |
| 2003/0093873 A1 | * 5/2003 | Linnenbrink ................... 16/85 |

FOREIGN PATENT DOCUMENTS

| | | | |
|---|---|---|---|
| DE | 0 255879 | * 7/1987 | |
| DE | 198 18 156 A1 | 10/1999 | ........... B60T/11/10 |
| JP | 2001-309674 | * 11/2001 | |

\* cited by examiner

Primary Examiner—Robert J. Sandy
Assistant Examiner—Andre' L. Jackson
(74) Attorney, Agent, or Firm—Cohen, Pontani, Lieberman & Pavane

(57) ABSTRACT

A catch for two objects moveable in relation to one another, in particular a door catch, includes a cylinder, which is operatively connected to a first object, a friction surface carrier, which is operatively connected to a second object, a friction element for creating a frictional grip between the cylinder and the friction surface carrier through an energy input. The friction element being connected to an electrical voltage supply device, wherein a change in the volume of the friction element, which constitutes an actuating movement of the friction element in relation to the friction surface, occurs as a function of the voltage applied to the friction element.

20 Claims, 2 Drawing Sheets

CATCH BETWEEN TWO ASSEMBLIES MOVEABLE IN RELATION TO ONE ANOTHER

BACKGROUND OF THE INVENTION

1. Field of the Invention

The invention relates to a catch between two objects that are moveable in relation to one another and particularly to a door catch.

2. Description of the Related Art

German reference DE 15 29 716 A1 discloses a hydropneumatic lifting unit having a hydraulic lock. The lifting unit has a working chamber, in which a working piston can perform an operating movement. An arbitrarily activatable friction element, the friction force of which is generated by an increase in volume, is arranged between the working piston and a wall which defines the working chamber. The increase in volume is achieved by feeding hydraulic medium into the elastically expandable friction element designed as hollow body.

German reference DE 199 10 782 A1 describes a door hinge having a cylinder which is filled with an electrorheological fluid. A piston formed as a vane divides the cylinder into at least two working chambers. A flow connection between the working chambers is subject to the influence of an electrical field, so that by varying the viscosity of the fluid inside the flow connection, a locking action is achieved. The retaining force of the door catch may be increased by designing the flow connection with the longest possible dimension. Such a design, however, limits the maximum swivel angle of the door hinge, since the flow connection is formed by a gap between the vane and the wall of the cylinder.

SUMMARY OF THE INVENTION

The object of the present invention is to create a catch between two objects moveable in relation to one another, which has a very simple construction and takes up little overall space.

According to the invention, the object is achieved in that the friction element is connected to an electrical voltage supply device and the volume of the friction element changes as a function of the voltage applied thereto. The change in volume of the friction element constitutes an actuating movement of the friction element in relation to the friction surface.

A particular characteristic of the catch is that it dispenses with locking valves or similar, sometimes expensive, assemblies while nevertheless permitting a continuously adjustable function over the operating travel of the catch.

The friction element may comprise a piezo actuator or it may be formed by a carbon actuator.

There are, in turn, several possibilities with regard to the construction of the carbon actuator. For example, the carbon actuator may be composed of fullerenes, which have a polyhedral structure. Alternatively the carbon actuator may also be designed in the form of fused capillaries. The capillaries may, in turn, be fused to form an easily manageable non-woven fabric, similar to paper.

To increase the friction effect and to provide a form of protection, the carbon actuator may be coated with a friction coating.

An especially simple electrical contact may be achieved if the carbon actuator is at least partially enclosed by an electrolyte.

The electrolyte may, for example, comprise a simple salt solution.

In one embodiment, the catch is designed as a swivel hinge and the friction surface carrier is formed by a hinge pin. A very favorable ratio is achieved between the size of the friction surface and the physical expansion of the cylinder according to this embodiment.

To achieve as compact a structure as possible, the hinge pin has a flange, which forms a cover for the swivel hinge.

The catch may optionally be fitted with a sensor assembly, which registers a relative movement of the two objects moveable in relation to one another. Furthermore, the catch may be controlled by the sensor assembly.

In a further embodiment, the sensor assembly has a mechanism with an input part and an output part. One of the input and output parts of the mechanism is operatively connected to the friction surface carrier and the other one of the input and output parts is connected to the cylinder. The mechanism makes it possible to increase the size of the sensor assembly to thereby improve the accuracy.

In this, the flange of the hinge pin is designed as one mechanism part and the cylinder has a bearing for receiving the other mechanism part that is formed eccentrically in relation to the central axis of the catch. It is possible to dispense with attachments for the sensor assembly on the two objects moveable in relation to one another.

To maximize the service life and to achieve the best possible operating accuracy and reliability under all conditions, the mechanism is designed as a gear mechanism.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings.

In the drawings, wherein like reference characters denote similar elements throughout the several views.

DETAILED DESCRIPTION OF THE PRESENTLY PREFERRED EMBODIMENTS

Figure 1:
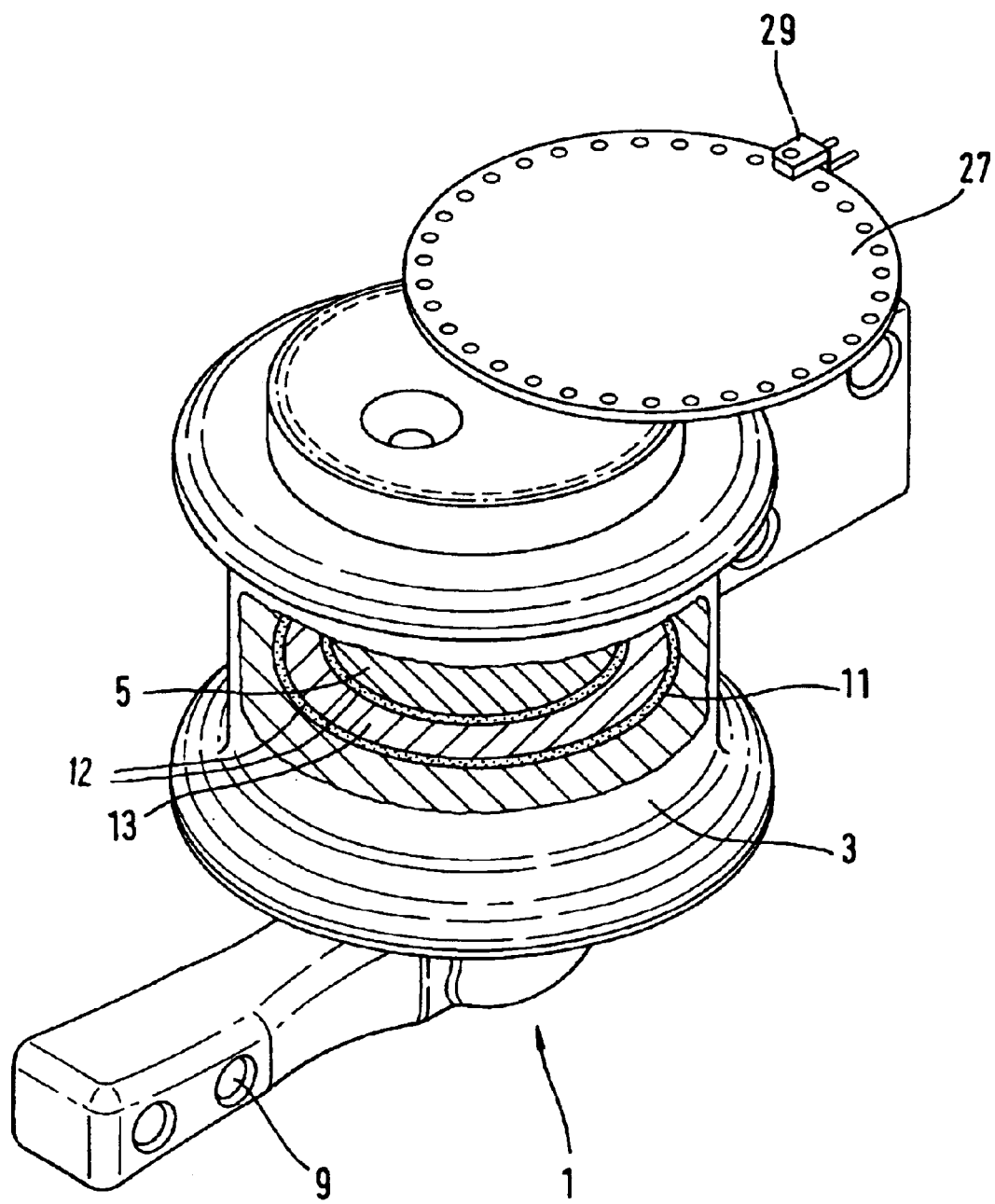
FIG. 1 is a perspective view of the catch according to an embodiment of the invention.
Figure 2:
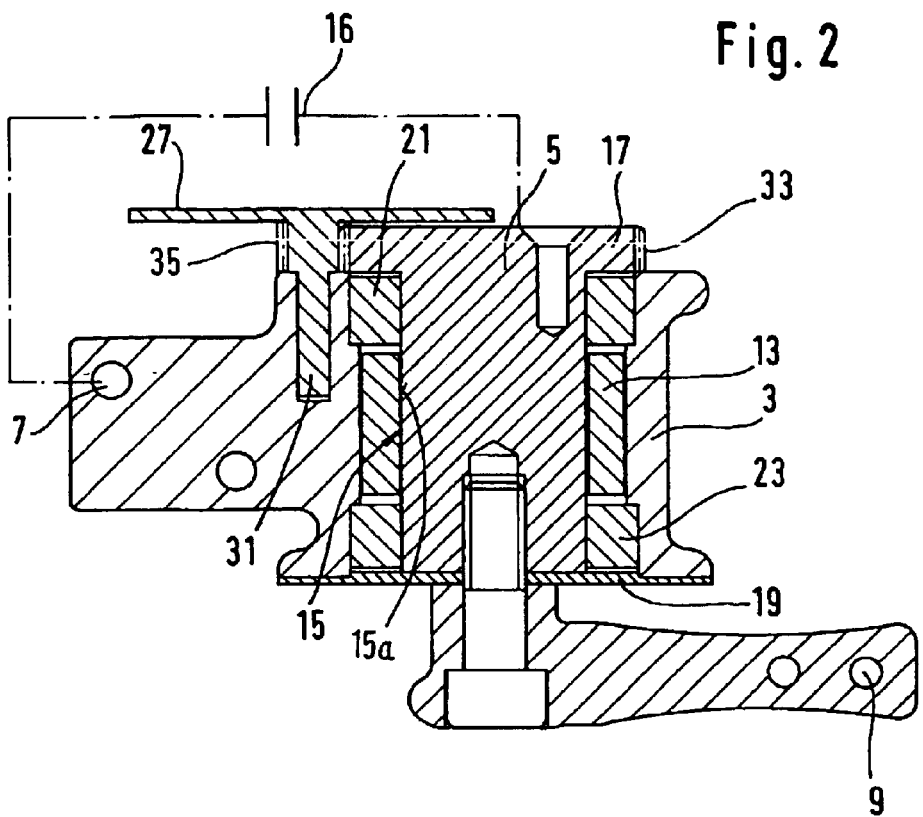
FIG. 2 is a sectional view of the catch along line II—II in FIG. 3.
Figure 3:
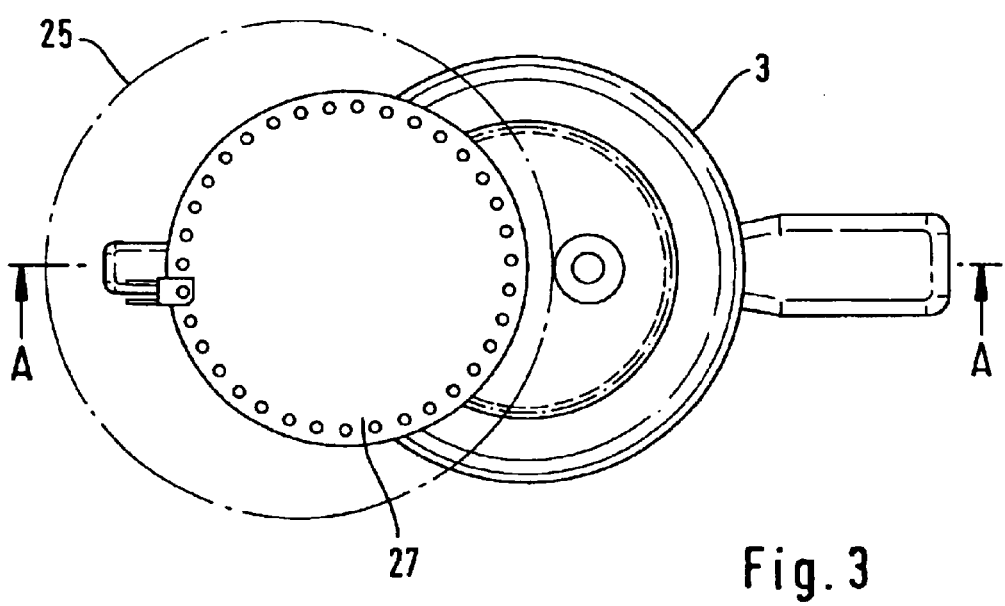
FIG. 3 is a top view of the catch of FIG. 1.

FIGS. 1 to 3 disclose a catch 1 which may, for example, be used between two objects moveable relative to each other such as a vehicle body (not shown) and vehicle door, the vehicle door constituting a moveable object. The catch 1 comprises a cylinder 3 and a friction surface carrier 5 arranged within the cylinder. The cylinder 3 and friction surface carrier are provided with respective connecting elements 7, 9 connecting them respectively to one of the objects. The friction surface carrier 5 and the cylinder 3 form an annular space 11 therebetween in which an actuator 13 is arranged. The actuator 13 experiences a change in volume as a function of a voltage applied to it. The catch 1 is designed as a swivel hinge and the friction surface carrier 5 forms a hinge pin of the swivel hinge. The circumferential surface of the hinge pin constitutes a friction surface 15 of catch 1.

Actuator 13 is composed of a material that includes carbon has a structure that includes fullerenes or capillaries which are fused together into a non-woven fabric. An example of a raw material which may be used to form the actuator is marketed under the designation of Bucky Paper or Bucky Balls. For transmitting the electrical voltage from an electrical voltage supply device 16, such as the vehicle battery, to actuator 13, the annular space 11 is at least partially filled with an electrolyte 12 such as, for example, a common salt solution. Hinge pin 5 includes a flange 17 as a cover for the annular space. The other side of the annular space is defined by an insulating washer 19. Additional end seals 21, 23 prevent loss of the electrolyte 12 from the catch 1.

As soon as an electrical voltage is applied to carbon actuator 13 via electrical connections (not shown) in catch 1, the actuator physically expands and establishes a contact with the inside wall of cylinder 3 and friction surface 15. At the same time, with the carbon actuator itself serving as friction element, a frictional grip that is equal to a retaining force between said vehicle door and the vehicle body is produced between the inside wall of the cylinder 3 and the hinge pin 5. To boost the friction and increase the service life, the non-woven fabric of the actuator 13 may also be coated with a friction coating 15a that does not have an insulating effect.

The catch is optionally provided with a sensor assembly 25 intended to register a relative movement of the objects moveable in relation to one another, that is movement of the vehicle door in relation to the vehicle body. Sensor assembly 25 comprises a signal generator 27, in this case a rotatable disk with position codes, and a fixed signal pickup 29, such as a photoelectric cell. The signal generator 27 is eccentrically supported axially parallel with the central axis of the catch 1 by a shaft 31 received in the cylinder 3. The signal generator is activated by a mechanism in response to relative movement inside catch 1. At its circumferential surface, the flange 17 of the hinge pin 5 is formed as a gear 33 and drives the shaft 31 of the disk of the signal generator 27 likewise provided with a gear profile 35. The two gears 33, 35 constitute an input part and an output part respectively of the mechanism for activating the signal generator. The mechanism 33, 35 expands the rotational movement inside the catch to increase the measuring accuracy of the sensor assembly 25. The purpose of the sensor assembly is as follows: in the event of an external force acting on the moveable object that exceeds a predetermined release force, the sensor assembly detects this as an intentional actuating force and initiates the release of catch 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described suggested form or embodiment as a general matter of design choice. It is the intention, therefore, to be limited only as indicated by the scope of the claims appended hereto.

We claim:

1. A catch for first and second objects moveable in relation to one another, comprising:

a cylinder for connection to the first object;

a fiction surface carrier for connection to the second object, said friction surface carrier being moveably connected to said cylinder such that said friction surface carrier is movable relative to said cylinder;

a friction element arranged between said cylinder and said friction surface carrier, said friction element being actuatable in response to an electrical voltage signal applied thereto for creating a frictional grip between said cylinder and said friction surface carrier to prevent relative movement between said cylinder and said friction surface carrier, said friction element changing in volume as a function of the electrical voltage signal applied thereto; and a sensor assembly for registering a relative movement of said cylinder and said friction surface carrier, wherein said sensor assembly comprises a mechanism having an input part and an output part, one of said input and output parts is connected to said friction surface carrier and the other of said input and output parts is connected to said cylinder.

2. The catch of claim 1, wherein said catch comprises a swivel hinge and said friction surface carrier comprises a hinge pin of said swivel hinge, said hinge pin comprising a flange forming a cover for said swivel hinge, and wherein said flange of said hinge pin is designed as said one of said input and output parts.

3. The catch of claim 1, wherein said cylinder comprises a central axis and said cylinder has a bearing for receiving the other one of said input and output parts of said mechanism, said bearing being formed eccentrically in relation to said central axis.

4. The catch of claim 1, wherein said mechanism comprises a gear mechanism.

5. A catch comprising a swivel hinge for first and second objects moveable in relation to one another, comprising:

a cylinder for connection to the first object;

a friction surface carrier comprising a hinge pin of the swivel hinge for connection to the second object, said friction surface carrier being pivotally connected to said cylinder such that said friction surface carrier is pivotal relative to said cylinder; and a friction element arranged between said cylinder and said friction surface carrier, said friction element being actuatable in response to an electrical voltage signal applied thereto for creating a frictional grip between said cylinder and said friction surface carrier to prevent relative movement between said cylinder and said friction surface carrier, said friction element changing in volume as a function of the electrical voltage signal applied thereto.

6. The catch of claim 5, wherein said friction element comprises a carbon actuator.

7. The catch of claim 6, wherein said carbon actuator is made of fullerenes.

8. The catch of claim 6, wherein said carbon actuator comprises fused capillaries.

9. The catch of claim 7, wherein said fullerenes are fused to form a non-woven fabric.

10. The catch of claim 8, wherein said capillaries are fused to form a non-woven fabric.

11. The catch of claim 9, wherein said carbon actuator is coated with a friction coating.

12. The catch of claim 10, wherein said carbon actuator is coated with a friction coating.

13. The catch of claim 5, further comprising an electrolyte at least partially enclosing said friction element.

14. The catch of claim 13, wherein said electrolyte comprises a salt solution.

15. The catch of claim 5, wherein said hinge pin comprises a flange forming a cover for said swivel hinge.

16. The catch of claim 5, further comprising a sensor assembly for registering a relative movement of said cylinder and said friction surface carrier.

17. The catch of claim 16, wherein said sensor assembly comprises a mechanism having an input part and an output part, one of said input and output parts is connected to said friction surface carrier and the other of said input and output parts is connected to said cylinder.

18. The catch of claim 17, wherein said catch comprises a swivel hinge and said friction surface carrier comprises a hinge pin of said swivel hinge, said hinge pin comprising a flange forming a cover for said swivel hinge, and wherein said flange of said hinge pin is designed as said one of said input and output parts.

19. The catch of claim 17, wherein said cylinder comprises a central axis and said cylinder has a bearing for receiving the other one of said input and output parts of said mechanism, said bearing being formed eccentrically in relation to said central axis.

20. The catch of claim 17, wherein said mechanism comprises a gear mechanism.

* * * * *